(12) United States Patent
Gabrecht et al.

(10) Patent No.: US 11,281,226 B2
(45) Date of Patent: Mar. 22, 2022

(54) METHOD FOR DETERMINING A ROUTE FOR A FLOOR CLEANING MACHINE

(71) Applicant: Hako GmbH, Bad Oldesloe (DE)

(72) Inventors: Alexander Gabrecht, Eutin (DE); Jan Helge Klüssendorff, Lübeck (DE); Joscha Stelljes, Ratzeburg (DE)

(73) Assignee: Hako GmbH, Bad Oldesloe (DE)

( * ) Notice: Subject to any disclaimer, the term of this patent is extended or adjusted under 35 U.S.C. 154(b) by 305 days.

(21) Appl. No.: 16/406,094

(22) Filed: May 8, 2019

(65) Prior Publication Data

US 2019/0346853 A1    Nov. 14, 2019

(30) Foreign Application Priority Data

May 14, 2018   (DE) .......................... 102018111509.1

(51) Int. Cl.
   *G05D 1/02* (2020.01)
   *A47L 11/40* (2006.01)

(52) U.S. Cl.
   CPC ........ *G05D 1/0221* (2013.01); *A47L 11/4011* (2013.01); *G05D 1/0225* (2013.01); *G05D 1/0255* (2013.01); *A47L 2201/02* (2013.01); *A47L 2201/04* (2013.01); *G05D 2201/0203* (2013.01)

(58) Field of Classification Search
   CPC .. G05D 1/0221; G05D 1/0225; G05D 1/0255; G05D 2201/0203; G05D 1/0227; G05D 2201/0215; A47L 11/4011; A47L 2201/02; A47L 2201/04; A47L 2201/06; A47L 11/4061; A47L 11/4066

USPC .......................... 701/23, 410, 411, 420, 487
   See application file for complete search history.

(56) References Cited

U.S. PATENT DOCUMENTS

| | | | | |
|---|---|---|---|---|
| 5,841,259 A | * | 11/1998 | Kim | H02G 11/02 |
| | | | | 318/587 |
| 2015/0150428 A1 | * | 6/2015 | Park | A47L 11/283 |
| | | | | 134/18 |
| 2015/0271991 A1 | * | 10/2015 | Balutis | A01D 34/008 |
| | | | | 700/264 |

(Continued)

FOREIGN PATENT DOCUMENTS

| DE | 102009052629 A1 | 5/2011 |
|---|---|---|
| DE | 102014110265 A1 | 1/2016 |
| DE | 102017109880 A1 | 11/2017 |

OTHER PUBLICATIONS

German Examination Report dated Jan. 21, 2019.

*Primary Examiner* — B M M Hannan
(74) *Attorney, Agent, or Firm* — Burris Law, PLLC

(57) ABSTRACT

A method for operating a floor cleaning machine having a selectively activatable cleaning element that is configured to engage with a floor cleaning surface when the cleaning element is activated. The method includes determining a transport path and an additional transport path; determining a work area and an additional work area, which are connected to the transport path and the additional transport path; and operating the floor cleaning machine over a route that includes a plurality of transport movements, which occur along the transport path and the additional transport path, and a plurality of cleaning movements that occur over the work area and the additional work area. The cleaning element is deactivated during transport movements and is activated during cleaning movements.

14 Claims, 2 Drawing Sheets

(56) References Cited

U.S. PATENT DOCUMENTS

Figure 1:
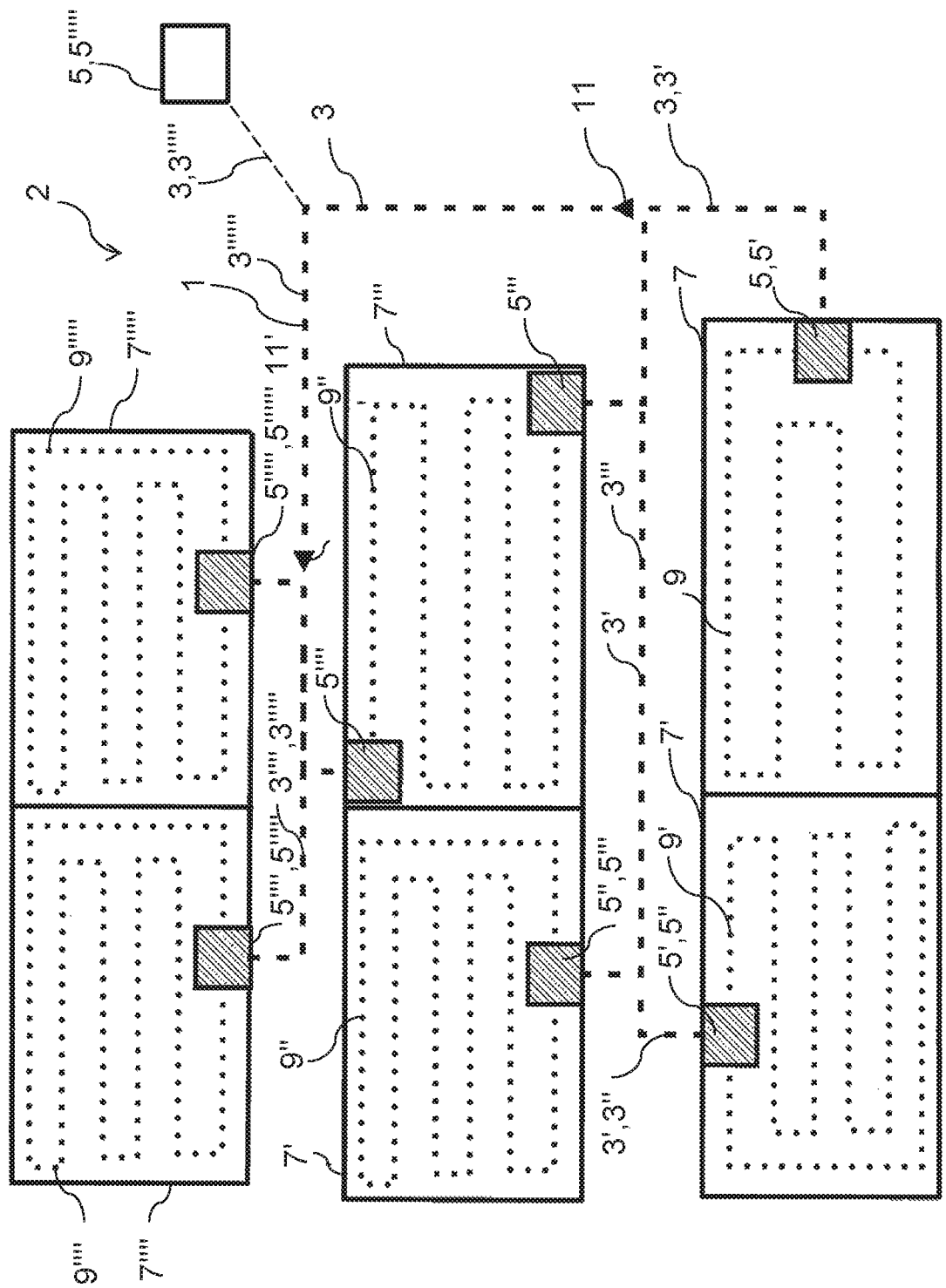

| | | | |
|---|---|---|---|
| 2016/0103451 A1* | 4/2016 | Vicenti | A47L 11/4061 |
| | | | 700/259 |
| 2017/0060137 A1* | 3/2017 | Shitamoto | G05D 1/0274 |
| 2020/0077860 A1* | 3/2020 | Lamon | G05D 1/0274 |

* cited by examiner

METHOD FOR DETERMINING A ROUTE FOR A FLOOR CLEANING MACHINE

FIELD

The present disclosure relates to a method for determining a route for a floor cleaning machine in a total area, wherein the floor cleaning machine comprises a cleaning element that can be activated for engagement with a floor surface.

BACKGROUND

Various methods can be employed to determine a route for a floor cleaning machine having a cleaning element that can be activated for engagement with a floor surface, particularly when the floor cleaning machine is employed to clean large floor surfaces, for example in public buildings or supermarkets. The total area is an area in which one or more floor surfaces to be cleaned are located. Within this total area, the floor cleaning machine can move along a transport path to a floor surface that is dirty and is therefore to be cleaned, or between a number of such floor surfaces to be cleaned. During a movement of the floor cleaning machine along a transport path, the cleaning element is deactivated so that the floor cleaning machine can move quickly to floor surfaces to be cleaned. The floor surface to be cleaned or the floor surfaces to be cleaned, which are also referred to as work areas, can be cleaned by the floor cleaning machine along freely determinable work paths. During a movement of the floor cleaning machine along a work path, the cleaning element is activated, at least along sections of the work path, so that the floor surface to be cleaned can be cleaned.

German Patent Application Publication No. DE 10 2017 109 880 A1, for example, describes that a model of the surroundings is first imported into a robot and an operator then draws a desired path of the robot into the imported model of the surroundings. The operator can also specify in which sections of the path the cleaning unit of the robot is to be active.

When determining a route for a floor cleaning machine, it is desirable for an operator to determine the route depending on the position and arrangement of the work area to be cleaned or the work areas to be cleaned, such that the work area or work areas can be approached and cleaned as time-efficiently and cost-effectively as possible by the floor cleaning machine.

SUMMARY

The object of the present invention is therefore to provide a method as described above such that the work area or work areas can be approached and cleaned as time-efficiently and cost-effectively as possible by the floor cleaning machine.

The object is achieved with a method for determining a route for a floor cleaning machine in a total area, wherein the floor cleaning machine comprises a cleaning element that can be activated for engagement with a floor surface, wherein a transport path is determined in a first step, wherein the total area comprises the transport path, wherein the transport path extends between a first and a second start/end area, wherein the cleaning element is deactivated during a movement of the floor cleaning machine along the transport path, wherein a work area is determined in a second step, wherein the total area comprises the work area, wherein the work area comprises at least one of the start/end areas, wherein the cleaning element is activated during a movement of the floor cleaning machine along a work path within the work area, wherein the route comprises the transport path.

A route is thus determined, that allows the desired work area or work areas to be approached and cleaned as time-efficiently and cost-effectively as possible. As a result of the fact that a route is determined which comprises only the transport path that extends to a start/end area disposed within the work area to be cleaned, it is possible to determine a route that guides the floor cleaning machine along a predetermined path to a floor surface to be cleaned, and at the same time provide the floor cleaning machine the option of determining the work path independently, i.e. autonomously, during the cleaning of the work area.

The floor cleaning machine is preferably a sweeping machine, a suction sweeping machine or a suction scrubbing machine.

The transport path is determined, for example, by first inputting the spatial coordinates of the first and the second start/end area, and then of intermediate stations along which the transport path is to run, via an interface of the floor cleaning machine. The input can, for example, be carried out in a spatial plan that is graphically displayed by the interface and comprises the work areas to be cleaned.

The work path is determined autonomously by the floor cleaning machine, for example, wherein the surroundings of the floor cleaning machine are preferably sensed by a sensor, a sensor group, or a sensor system. The work path is furthermore determined, for example, by first inputting the spatial coordinates of the first and the second start/end area, and then of intermediate stations along which the work path is to run, via an interface of the floor cleaning machine. The input can, for example, be carried out in a spatial plan that is graphically displayed by the interface and comprises the work areas to be cleaned.

The start/end areas are areas in the total area, of which two respectively delimit one transport path, so that the start and the end of the respective transport path is spatially determined as part of the route. Each of the start/end areas can be located in a floor area to be cleaned, i.e. in a work area, for example, so that the start/end area specifies the start of a transport path away from the floor surface to be cleaned, for example, or the end of a transport path toward the floor surface to be cleaned. Each of the start/end areas can alternatively also be located outside a floor area to be cleaned, i.e. outside a work area, for example, so that the start/end area specifies the start of a transport path toward the floor surface to be cleaned, for example, or the end of a transport path away from the floor surface to be cleaned.

The transport paths can be specified once and then retrieved for any routes. One respective start/end area further preferably forms the start and one start/end area forms the end of each work path, so that the start and end of each work path are spatially defined as part of the route. The cleaning element is preferably activated or deactivated in the start/end areas located in one work area in each case, and the deactivated cleaning element is not reactivated in the start/end areas located outside the work area or the work areas. If there is a start/end area outside of the work area or the work areas, it often determines the start or the end of the route.

The total area preferably comprises a building. The transport path is furthermore preferably disposed inside the building. This makes automatic transport of the floor cleaning machine within the building possible. The transport path can alternatively be disposed outside the building. This makes a transport of the floor cleaning machine, for example between two buildings, possible. The work area is furthermore preferably disposed inside the building. This makes a cleaning of the building, or a part of the building, by the floor cleaning machine possible. The work area is preferably disposed outside the building. This makes it possible for the floor cleaning machine to clean areas adjoining the building. The work area is preferably a room or a part of a room inside the building. This makes cleaning the room or a part of the room possible.

The cleaning element preferably comprises a cleaning head. The floor cleaning machine is preferably configured such that, when the cleaning element is activated, the cleaning head is lowered to the floor surface to be cleaned and, if necessary, pressed against said floor surface and, when the cleaning element is deactivated, the cleaning head is lifted away from or disposed at a distance to the floor surface to be cleaned.

In one embodiment, the work path within the work area is determined in a third step. To do this, the work path is determined as described above, for example. The route preferably comprises the work path. A route, which allows the work area to be approached and cleaned in a particularly time-efficient and cost-effective manner, is thus determined without requiring an intervention by the user. A route is determined, which comprises the work path and thus allows the transport path and the work path to be combined to one total path.

Preferentially, the chronological sequence of the first step, the second step and the third step is not specified. The first step, the second step, and the third step can instead be carried out in any possible sequence or also in parallel with one another. The first step is carried out prior to the movement of the floor cleaning machine along the transport path, for example. In addition, the second step is carried out prior to the movement of the floor cleaning machine along the transport path as well. Further preferably, the second step is alternatively carried out during or after the movement of the floor cleaning machine along the transport path. The third step is preferably carried out prior to the movement of the floor cleaning machine along the transport path as well. Further preferably, the third step is alternatively carried out during or after the movement of the floor cleaning machine along the transport path. This provides a variety of sequences of the method steps and consequently a flexible method.

In one embodiment, at least one additional transport path is determined in the first step. The total area preferably comprises all of the additional transport paths. Each one of the additional transport paths further preferably extends between a first additional and a second additional start/end area. In addition, during a movement of the floor cleaning machine along each one of the additional transport paths, the cleaning element is deactivated.

Furthermore, at least one additional work area is preferably determined in the second step, wherein the total area comprises all of the additional work areas. Each one of the additional work areas also preferably comprises at least one of the additional start/end areas. Furthermore, in particular during a movement of the floor cleaning machine within each one of the additional work areas in each case along an additional work path, the cleaning element is at least temporarily activated. Each of the additional work areas is preferably a room.

The building preferably comprises at least one of the additional work areas. In addition, the total area is preferably the building. Preferably, at least one of the additional work areas is a room or part of a room inside the building. The route preferably comprises all of the additional transport paths. It is thus possible to provide a route having at least two transport paths. As a result, starting from an additional work area or a supply device, in particular a charging station and/or a service station, such as a water change station and/or a sweepings disposal station, for example, a work area can be approached by the floor cleaning machine in a time-efficient manner and without further intervention by the user. After cleaning the work area, the floor cleaning machine can move further in the direction of an additional work area or a supply device, in particular a charging station. A complex configuration of the route from multiple transport paths is thus made possible, whereby multiple work areas can be approached.

In one embodiment, each one of the additional work paths within the respective additional work area is determined in the third step. In a further embodiment, at least one of the additional work paths within the respective additional work area is determined in the third step. The route preferably comprises each one of the additional work paths, in particular each one of the determined additional work paths. A route, which allows multiple work areas to be approached and cleaned in a particularly time-efficient and cost-effective manner, is thus determined without requiring further interventions by the user. A route is determined, which preferably comprises at least two transport paths as well as at least two work paths, and thus allows a combination of at least two transport paths and at least two work paths to one total path. An even more complex configuration of the route from multiple transport paths and multiple work paths is thus made possible, whereby a plurality of work areas can be approached and cleaned.

In the event that the cleaning element is activated only along sections of the work path during a movement of the floor cleaning machine, the cleaning element is deactivated during a movement of the floor cleaning machine along the remaining sections of the work path, so that the floor cleaning machine can also quickly move along the remaining sections of the work path, in particular in order to reach floor surfaces to be cleaned. It is preferably provided that, during a movement of the floor cleaning machine along at least the work path or one of the additional work paths, the cleaning element is deactivated. In other words, at least one work or cleaning path can also be used for a transport trip of the floor cleaning machine and/or be traveled only partially, in order to make a short and optimal transport route possible.

In one embodiment, the transport path and/or each one of the additional transport paths are determined by teaching. As a result, it is easily possible to determine the transport path and/or each one of the additional transport paths prior to the movement of the floor cleaning machine along the transport path and/or along each one of the additional transport paths.

In one embodiment, the teaching includes traveling the transport path and/or each one of the additional transport paths with the floor cleaning machine, whereby a user moves the floor cleaning machine along the transport path and the corresponding sequence of positions in the total area is recorded. By traveling the transport path and/or each one of the additional transport paths with the floor cleaning machine, it is thus possible to determine the transport path and/or each one of the additional transport paths without importing a model of the surroundings into the floor cleaning machine. The transport path and/or each one of the additional transport paths can alternatively be input via an interface, in particular a touchscreen. The transport path and/or each one of the additional transport paths can hereby also be determined as a function of actually existing spatial conditions and obstacles. It is furthermore possible to determine the transport path and/or each one of the additional transport paths in a particularly user-friendly manner by inputting the transport path and/or each one of the additional transport paths via the interface. It is preferably provided that the transport path and/or each one of the additional transport paths can be traveled at least partially in opposite or in both directions during different time intervals. The direction in which the transport path and/or each one of the additional transport paths is to be traveled by the floor cleaning machine in each case can respectively be determined by the operator via the interface, for example, or automatically or autonomously by the floor cleaning machine. The teaching alternatively or additionally includes mapping the surroundings, in particular the surroundings of the transport path and/or each one of the additional transport paths. Automatic route planning for the transport path and/or each one of the additional transport paths is thus ensured or made possible. This makes a better image of the surroundings possible for the floor cleaning machine and also allows the automatic calculation of later routes.

The work area, and/or each one of the additional work areas, is preferably determined by teaching or autonomously by the floor cleaning machine. It is thus possible to determine the work area and/or each one of the additional work areas prior to the movement of the floor cleaning machine within the work area and/or each one of the additional work areas, or, alternatively, to determine the work area and/or each one of the additional work areas during the movement of the floor cleaning machine along the work path and/or along each one of the additional work paths, in particular automatically or autonomously.

The teaching preferably includes traveling the work area and/or each one of the additional work areas with the floor cleaning machine. By traveling the work area and/or each one of the additional work areas with the floor cleaning machine, it is thus possible to determine the work area and/or each one of the additional work areas without importing a model of the surroundings into the floor cleaning machine. The work area and/or each one of the additional work areas can hereby also be determined as a function of actually existing spatial conditions and obstacles. It is furthermore possible for the work area and/or each one of the additional work areas to be input via an interface, in particular a touchscreen. By inputting the work area and/or each one of the additional work areas via the interface, this is carried out in a particularly user-friendly manner. The teaching alternatively or additionally includes mapping the surroundings, in particular the surroundings of the work area and/or each one of the additional work areas, or the surroundings of the floor cleaning machine within the work area and/or each one of the additional work areas, such as shelves or walls within the work area and/or each one of the additional work areas, for example. This ensures or permits automatic route planning for the work area and/or each one of the additional work areas. This makes a better image of the surroundings possible for the floor cleaning machine and also allows the automatic calculation of later routes.

In one embodiment, the autonomous determination includes sensing the surroundings of the floor cleaning machine. By sensing the surroundings of the floor cleaning machine, the work path and/or each one of the additional work paths, and thus the route, can be determined as a function of quickly changing spatial conditions and obstacles, or newly appearing obstacles. The surroundings are preferably sensed using one or more collision sensors of the floor cleaning machine. A reliable embodiment is thus provided. Alternatively or additionally, the surroundings are preferably sensed using one or more ultrasonic sensors and/or infrared sensors and/or laser sensors and/or 3D scanners. An especially precise sensing of the surroundings is thus provided. The autonomous determination alternatively or additionally includes mapping the work area. As a result, a shortened cleaning process substantially without omissions is made possible.

In one embodiment, the work path, and/or each one of the additional work paths, is determined by teaching or autonomously by the floor cleaning machine. It is thus possible to determine the work path and/or each one of the additional work paths prior to the movement of the floor cleaning machine along the work path and/or along each one of the additional work paths, or, alternatively, to determine the work path and/or each one of the additional work paths during the movement of the floor cleaning machine along the work path and/or along each one of the additional work paths, in particular automatically or autonomously. It is preferably provided that the work path and/or each one of the additional work paths can be traveled at least partially in opposite or in both directions during different time intervals. The direction in which the work path and/or each one of the additional work paths is to be traveled by the floor cleaning machine in each case can respectively be determined by the operator via the interface, for example, or automatically or autonomously by the floor cleaning machine.

In one embodiment, the teaching includes traveling the work path and/or each one of the additional work paths with the floor cleaning machine. By traveling the work path and/or each one of the additional work paths with the floor cleaning machine, it is thus possible to determine the work path and/or each one of the additional work paths without importing a model of the surroundings into the floor cleaning machine. The work path and/or each one of the additional work paths can hereby also be determined as a function of actually existing spatial conditions and obstacles. It is furthermore possible for the work path and/or each one of the additional work paths to be input via an interface, in particular a touchscreen. By inputting the work path and/or each one of the additional work paths via the interface, this is carried out in a particularly user-friendly manner. The teaching alternatively or additionally includes mapping the surroundings, in particular the surroundings of the work path and/or each one of the additional work paths. This ensures or makes automatic route planning for the work path and/or each one of the additional work paths possible. This makes a better image of the surroundings possible for the floor cleaning machine and also allows the automatic calculation of later routes.

In one embodiment, the autonomous determination includes sensing the surroundings of the floor cleaning machine. By sensing the surroundings of the floor cleaning machine, the work path and/or each one of the additional work paths, and thus the route, can be determined as a function of quickly changing spatial conditions and obstacles, or newly appearing obstacles. The surroundings are preferably sensed using one or more collision sensors of the floor cleaning machine. A reliable embodiment is thus provided. Alternatively or additionally, the surroundings are preferably sensed using one or more ultrasonic sensors and/or infrared sensors and/or laser sensors and/or 3D scanners. An especially precise sensing of the surroundings is thus provided. The autonomous determination alternatively or additionally includes mapping the work area. As a result, a shortened cleaning process substantially without omissions is made possible.

Preferably, one or more maps are generated and stored temporarily, for example in the floor cleaning machine. Preferably, one or more maps, for example for a transport path, a work area and/or a work path, respectively, are generated and stored temporarily, for example in the floor cleaning machine. As a result, the maps can be updated and maintained more easily later.

In one embodiment, one of the start/end areas and one of the additional start/end areas coincide. It is thus possible to provide a continuous route having at least two transport paths.

In one embodiment, one of the start/end areas comprises a supply device, in particular a charging station and/or a service station, such as a water change station and/or a sweepings disposal station, for example. The supply device is a full-service docking station for the floor cleaning machine, for example. The supply device preferably comprises a device for emptying water, in particular dirty water, from the floor cleaning machine. The supply device preferably comprises a device for refilling water, in particular fresh water, into the floor cleaning machine. The supply device preferably comprises a device for cleaning a tank of the floor cleaning machine. The supply device preferably comprises a waste container for the floor cleaning machine, in particular for a sweeping machine. Sweepings from the sweeping machine can preferably be unloaded into the waste container automatically. Different supply devices can thus be made available to the floor cleaning machine in the total area. Preferably, at least one of the start/end areas comprises a supply device, in particular a charging station, and/or at least one of the additional start/end areas respectively comprises a supply device, in particular a respective charging station. Preferably, at least one supply device in at least one of the start/end areas and the additional start/end areas is a supply device for waste disposal and at least one supply device in at least one of the start/end areas and the additional start/end areas is a charging station. As a result, it is possible to provide a route that makes it possible to clean a work area with the aid of the floor cleaning machine and also move the floor cleaning machine from the work area to the supply device or from the supply device to the work area. Preferably, at least one of the start/end areas comprises multiple supply devices, in particular multiple charging stations, and/or at least one of the additional start/end areas respectively comprises multiple supply devices, in particular multiple respective charging stations. This makes it possible to provide a route, along which multiple floor cleaning machines can be loaded within one of the start/end areas and/or within one of the additional start/end areas.

In one embodiment, both the remaining distance of the route and the remaining distance of the floor cleaning machine corresponding to a residual quantity of a charge, in particular a battery charge or battery capacity and/or water load or water capacity, especially fresh water load or fresh water capacity and/or dirty water load or dirty water capacity, and/or sweepings container load or fill level of a container such as sweepings container, for example, are determined along the route. The remaining distance of the route and the remaining distance of the floor cleaning machine corresponding to the residual quantity of the charge, in particular the residual quantity of the charge battery charge and/or fresh water load and/or dirty water load and/or sweepings container load, are preferably compared to one another. The route is preferably divided into a plurality of route sections. Preferably, at the beginning of each route section, both the distance of the route remaining at the beginning of the respective route section and the distance of the floor cleaning machine corresponding to the residual quantity of the charge, in particular the battery charge and/or fresh water load and/or dirty water load and/or sweepings container load, remaining at the beginning of the respective route section are determined and the distance of the route remaining at the beginning of the respective route section and the distance of the floor cleaning machine corresponding to the residual quantity of the charge, in particular the battery charge and/or fresh water load and/or dirty water load and/or sweepings container load, remaining at the beginning of the respective route section are also compared to one another.

In the event, for example, that the remaining distance of the route is greater than the remaining distance of the floor cleaning machine corresponding to the residual quantity of the charge, in particular the battery charge and/or fresh water load and/or dirty water load and/or sweepings container load, the supply device, which is at the least distance from the floor cleaning machine of a plurality of supply devices, in particular a charging station of a plurality of charging stations, in the total area, is determined. In this case, the remaining route is preferably changed such that the remaining route extends to a start/end area that comprises the supply device which is at the least distance from the floor cleaning machine. Furthermore, in the event that the remaining distance of the route is smaller than the remaining distance of the floor cleaning machine corresponding to the residual quantity of the charge, in particular the battery charge and/or fresh water load and/or dirty water load and/or sweepings container load, for example, the route is not changed. This makes it possible for the floor cleaning machine to be able to travel the route without interruption or, should this not be possible, not have to interrupt the cleaning trip along the route because of a too low battery charge and/or a too low fresh water load and/or a too high dirty water load and/or a too high sweepings container load, for example.

In one embodiment, the transport path and/or each one of the additional transport paths and/or the work path and/or each one of the additional work paths are stored in the floor cleaning machine, whereby a route is combined from the stored transport path and/or each one of the stored additional transport paths and/or the stored work path and/or each one of the stored additional work paths. By storing at least one transport path and/or at least one work path, the at least one stored route section can be used for different complex routes that can later be combined by a user with a selection from the memory. Preferably, the operator determines the work areas, i.e. selects the work areas from a quantity of work areas, and, using the determined or selected work areas, in particular in an intelligent manner, to determine the route, the floor cleaning machine combines or determines which transport paths are necessary for cleaning the determined or selected work areas, in which sequence and direction, for example, the determined or selected work areas and necessary transport paths are to be traveled, and which supply devices or intermediate points for charging and/or water change and/or sweepings disposal on the route are used or approached by the floor cleaning machine as part of the route. In doing so, the floor cleaning machine preferably selects the transport paths and supply devices, in particular service areas, autonomously.

DRAWINGS

Figure 2:
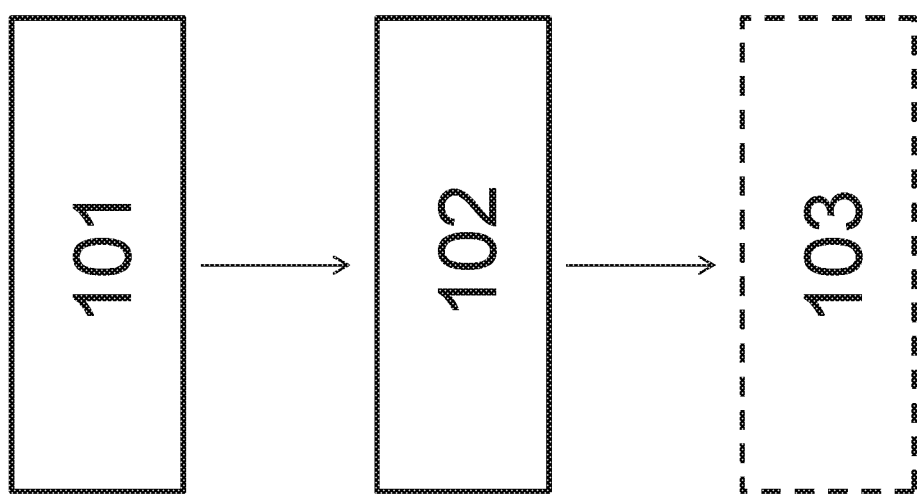

Design examples of the method according to the invention are described in the following on the basis of solely exemplary schematic drawings, wherein:

FIG. 1 is a schematic drawing of an embodiment of the method according to the invention; and FIG. 2 is a flow chart of an embodiment of the method according to the invention.

DETAILED DESCRIPTION

FIG. 1 shows a schematic drawing of an embodiment of the method according to the invention for determining a route 1 for a floor cleaning machine in a total area 2. The method according to the invention is provided for a floor cleaning machine comprising a cleaning element that can be activated for engagement with a floor surface. In a preferred embodiment, the total area 2 comprises a building with a plurality of rooms. FIG. 1 further shows a transport path 3 and six additional transport paths 3', 3", 3'", 3"", 3'"", 3"""" as well as start/end areas 5 and additional start/end areas 5', 5", 5'", 5"", 5'"", 5"""". FIG. 1 also shows a work area 7 and five additional work areas 7', 7", T'", 7"", 7'"" as well as a work path 9 and five additional work paths 9', 9", 9'", 9"", 9'"". In the design example described here, the transport paths 3, 3', 3", 3'", 3"", 3'"", 3"""" partially extend between the rooms, and a portion of the start/end areas 5, 5', 5", 5'", 5"", 5'"", 5"""" is respectively provided in one room. Lastly, the work paths 9, 9', 9", 9'", 9"", 9'"" extend along floor surfaces to be cleaned, in the case of the design example respectively in one room. FIG. 2 shows a flow chart of an embodiment of the method according to the invention, in which a first step 101 and a second step 102 and an optional third step 103 (dashed) are depicted.

In the first step 101, the transport path 3 and the six additional transport paths 3', 3", 3'", 3"", 3'"", 3"""" are determined (see FIG. 1). In the design example described here this is achieved by teaching, by a user traveling the respective transport path 3, 3', 3", 3'", 3"", 3'"", 3"""" with the floor cleaning machine, whereby the spatial coordinates for the transport path 3, 3', 3", 3'", 3"", 3'"", 3"""" are recorded by the floor cleaning machine. Alternatively, it is also possible to determine the transport paths 3, 3', 3", 3'", 3"", 3'"", 3"""" by inputting the spatial coordinates into an interface of the floor cleaning machine, for example, whereby the spatial coordinates again define different points along the transport path 3 and the six additional transport paths 3', 3", 3'", 3"", 3'"", 3"""". The total area 2 hereby comprises the transport path 3 and the six additional transport paths 3', 3", 3'", 3"", 3'"", 3"""". The transport path 3 extends between a first and a second start/end area 5. Each of the additional transport paths 3', 3", 3'", 3"", 3'"", 3"""" respectively extends between a first additional and a second additional start/end area 5', 5", 5'", 5"", 5'"", 5"""". The transport path 3 and each one of the additional transport paths 3', 3", 3'", 3"", 3'"", 3"""" is respectively disposed such that, when traveling the route 1, the floor cleaning machine can move toward a floor surface to be cleaned in a room or away from a floor surface to be cleaned.

During a movement of the floor cleaning machine along the transport path 3 and each of the six additional transport paths 3', 3", 3'", 3"", 3'"", 3"""", the cleaning element is deactivated.

In the second step 102, a work area 7 and five additional work areas 7', 7", 7'", 7"", 7'"" are determined. The total area 2 hereby comprises the work area 7 as well as each of the five additional work areas 7', 7", 7'", 7"", 7'"". In the design example described here, the work areas 7, 7', 7", 7'", 7"", 7'"" are respectively disposed in rooms of a building. The work area 7 comprises one of the start/end areas 5 and each one of the additional work areas 7', 7", 7'", 7"", 7'"" respectively comprises at least one of the additional start/end areas 5', 5", 5'", 5"", 5'"", 5"""".

In the embodiment shown here, the work area 7 comprises one of the start/end areas 5 and one of the additional start/end areas 5', wherein the start/end area 5 comprised in the work area 7 and the additional start/end area 5' comprised in the work area 7 coincide, i.e. are identically disposed, within the total area 2. In other words, one of the start/end areas 5 and one of the additional start/end areas 5' is disposed in the work area 7 and the work path 9 starts and ends here at the same location. The same applies to the respective arrangement of the additional start/end areas 5', 5", 5'", 5"", 5'"", 5"""" within the additional work areas 7', 7", 7'", 7"", 7'"", namely in the following manner: The additional work area 7' comprises two of the additional start/end areas 5', 5", wherein the additional start/end areas 5', 5" comprised in the additional work area 7' coincide, i.e. are identically disposed, within the total area 2. The additional work area 7" further comprises two of the additional start/end areas 5", 5'", wherein the additional start/end areas 5", 5'" comprised in the additional work area 7" coincide, i.e. are identically disposed, within the total area 2. The additional work area 7'" further comprises two of the additional start/end areas 5'", 5"", wherein the additional start/end areas 5'", 5"" comprised in the additional work area 7'" are disposed spaced apart from another in the additional work area 7'". The additional start/end areas 5'", 5"" are preferably disposed in opposite corners of the additional work area 7'" as shown in FIG. 1, so that a cleaning start can take place in one of the additional start/end areas 5'", 5"" and a cleaning stop can take place in the other of the additional start/end areas 5'", 5"" and a room 7'" having two entrances or exits, for example, can be cleaned efficiently. The additional work area 7"" further comprises two of the additional start/end areas 5"", 5'"", wherein the additional start/end areas 5"", 5'"" comprised in the additional work area 7"" coincide, i.e. are identically disposed, within the total area 2. Lastly, the additional work area 7'"" comprises two of the additional start/end areas 5'"", 5"""", wherein the additional start/end areas 5'"", 5"""" comprised in the additional work area 7'"" coincide, i.e. are identically disposed, within the total area 2.

During a movement of the floor cleaning machine within the work area 7 along a work path 9 and within each of the five additional work areas 7', 7", 7'", 7"", 7'"" respectively along am additional work path 9', 9", 9'", 9"", 9'"", the cleaning element is activated at least in sections. However, it is also conceivable for the cleaning element to be permanently activated. As shown in FIG. 1, the work path 9 and the additional work paths 9', 9", 9"", 9'"" are closed paths, wherein the additional work path 9'" is a work path with different start and end points, i.e. additional start/end areas 5'", 5"".

In the optional third step 103, the work path 9 is determined within the work area 7 and each one of the additional work paths 9', 9", 9'", 9"", 9'"" is determined within the respective additional work area 7', 7", T'", 7"", 7'"". For example, the work path 9 and each one of the additional work paths 9', 9", 9'", 9"", 9'"" is determined by teaching, in particular by traveling the work path 9 and/or each one of the additional work paths 9', 9", 9'", 9"", 9'"" with the floor cleaning machine, and/or by inputting the work path 9 and/or of each one of the additional work paths 9', 9", 9'", 9"", 9'"" via an interface, in particular a touchscreen. Alternatively, the work path 9 and each one of the additional work paths 9', 9", 9'", 9"", 9'"" can, for example, be determined autonomously by the floor cleaning machine, for example in that the floor cleaning machine senses the surroundings of the floor cleaning machine. The surroundings are preferably sensed using one or more collision sensors or 3D sensors of the floor cleaning machine. Alternatively or additionally, the surroundings are preferably sensed using one or more ultrasonic sensors and/or infrared sensors and/or laser sensors. Alternatively or additionally, the autonomous determination comprises mapping the work area, as a result of which a shortened cleaning process substantially without omissions is made possible.

It is preferably provided that the transport path 3 and each one of the additional transport paths 3', 3", 3"', 3"", 3""', 3"""' is determined or taught first, then the work area 7 and each one of the additional work areas 7', 7", 7"', 7"", 7""' is determined, and lastly the work path 9 and each one of the additional work paths 9', 9", 9"', 9"", 9""' is determined or taught. Alternatively, however, it is also provided that any combination of transport path 3, additional transport path 3', 3", 3"', 3"", 3""', 3"""', work area 7, additional work area 7', 7", 7"', 7"", 7""', work path 9 and additional work path 9', 9", 9"', 9"", 9""' is determined or taught and preferably stored temporarily first, and subsequently any other combination of transport path 3, additional transport path 3', 3", 3"', 3"", 3""', 3"""', work area 7, additional work area 7', 7", 7"', 7"", 7""', work path 9 and additional work path 9', 9", 9"', 9"", 9""' is determined or taught and preferably stored temporarily. Complex routes can consequently be changed, for example expanded, as needed.

In the presently shown design example, the route 1 comprises the transport path 3, each one of the additional transport paths 3', 3", 3"', 3"", 3""', 3"""', the work path 9 and each one of the additional work paths 9', 9", 9"', 9"", 9""'.

The route 1 shown in FIG. 1 is provided for a movement of the floor cleaning machine in the following sequence: additional transport path 3"""'-additional work path 9""'-additional transport path 3""'-additional work path 9""-additional transport path 3""-additional work path 9"'-additional transport path 3"'-additional work path 9"-additional transport path 3"-additional work path 9'-additional transport path 3'-work path 9-transport path 3.

Alternatively, however, a movement of the floor cleaning machine in the opposite direction is possible as well.

The transport path 3 and each one of the additional transport paths 3', 3", 3"', 3"", 3""', 3"""' is provided for a "transport trip" of the floor cleaning machine, i.e. for a movement of the floor cleaning machine within the total area 2 with a deactivated cleaning element. The work path 9 and each one of the additional work paths 9', 9", 9"', 9"", 9""' is additionally provided for a "cleaning trip" of the floor cleaning machine, i.e. for a movement of the floor cleaning machine within the total area 2 with the cleaning element activated at least in sections. The work path 9 and each one of the additional work paths 9', 9", 9"', 9"", 9""' can also be understood as cleaning paths.

The movement of the floor cleaning machine along the transport path 3 or along each of the six additional transport paths 3', 3", 3"', 3"", 3""', 3"""' and the movement of the floor cleaning machine along the work path 9 or along each of the additional work paths 9', 9", 9"', 9"", 9""' respectively starts and ends in the start/end areas 5 and the additional start/end areas 5', 5", 5"', 5"", 5""', 5"""'. The start/end areas 5 and the additional start/end areas 5', 5", 5"', 5"", 5""', 5"""' can also be referred to as start/end zones. The cleaning element is preferably respectively activated and/or deactivated here. The start/end areas 5 and the additional start/end areas 5', 5", 5"', 5"", 5""' can respectively also only determine the start or the end of a route. The start/end area 5, for example, which is disposed outside the work area 7 and outside each one of the five additional work areas 7', 7", 7"', 7"", 7""' determines the end of the route 1, and the additional start/end area 5"""', which is disposed outside the work area 7 and outside each one of the five additional work areas 7', 7", 7"', 7"", 7""' determines the start of the route 1.

In the presently shown design example, the transport path 3 and/or each one of the additional transport paths 3', 3", 3"', 3"", 3""', 3"""' is determined by teaching. In doing so, the teaching includes traveling the transport path 3 and each one of the additional transport paths 3', 3", 3"', 3"", 3""', 3"""' with the floor cleaning machine. In the presently shown design example, it is alternatively provided that the teaching includes inputting the transport path 3 and/or each one of the additional transport paths 3', 3", 3"', 3"", 3""', 3"""' via an interface.

In the present case, the work path 9 and each one of the additional work paths 9', 9", 9"', 9"", 9""' is autonomously determined by the floor cleaning machine. According to the invention, the autonomous determination includes sensing the surroundings of the floor cleaning machine. In the presently shown design example, it is alternatively provided that the work path 9 and each one of the additional work paths 9', 9", 9"', 9"", 9""' are determined by teaching. The teaching hereby includes traveling the work path 9 and each one of the additional transport paths 9', 9", 9"', 9"", 9""' with the floor cleaning machine and/or inputting the work path 9 and each one of the additional work paths 9', 9", 9"', 9"", 9""' via an interface.

In the present design example, the transport path 3 and each one of the additional transport paths 3', 3", 3"', 3"", 3""', 3"""' on the one hand, and the work path 9 and each one of the additional work paths 9', 9", 9"', 9"", 9""' on the other hand, are preferably separately programmable, in particular by an operator of the floor cleaning machine.

In the present design example, one of the start/end areas 5 and one of the additional start/end areas 5"""' are disposed outside the work area 7 and outside the additional work areas 7', 7", 7"', 7"", 7""'. In addition, the one of the start/end areas 5 and the one of the additional start/end areas 5"""' coincide, i.e. the one of the start/end areas 5 and the one of the additional start/end areas 5"""' are identically disposed within the total area 2. The one of the start/end areas 5 and the one of the additional start/end areas 5"""' hereby comprise a charging station, in particular a battery charging station, and/or a service station, such as a water change station and/or a sweepings disposal station.

Furthermore, both the remaining distance of the route 1 and the remaining distance of the floor cleaning machine corresponding to a residual quantity of a charge, in particular a battery charge or battery capacity and/or water load or water capacity, especially fresh water load or fresh water capacity and/or dirty water load or dirty water capacity, and/or sweepings container load or fill level of a container such as sweepings container, for example, are determined along the route 1, whereby the remaining distance of the route 1 and the remaining distance corresponding to the residual quantity of the charge of the floor cleaning machine are compared to one another.

Lastly, a specification of the direction is provided for the route 1, in particular a specification of the direction of the transport path 3 and the additional transport paths 3', 3", 3"', 3"", 3""', 3"""', a so-called transport trip with a specification of the direction. In other words, the direction 11, 11' of the route 1 can be determined, for example by an operator of the interface or autonomously by the floor cleaning machine. The specification of the direction means, for example, that, during a transport trip of the floor cleaning machine, the corresponding transport path 3, 3', 3'', 3''', 3'''', 3''''', 3'''''' can only be traveled in the specified direction. The route 1 shown in FIG. 1 is provided for a movement of the floor cleaning machine in the following sequence: additional start/end area 5'''''' disposed outside the work area 7 and the additional work areas 7', 7'', 7''', 7'''', 7'''''-additional start/end area 5''''' inside the additional work area 7'''''-additional start/end area 5'''' inside the additional work area 7''''-additional start/end area 5''' inside the additional work area 7'''-additional start/end area 5''' inside the additional work area 7'''-additional start/end area 5'''' inside the additional work area 7''''-additional start/end area 5'' inside the additional work area 7''-additional start/end area 5'' inside the additional work area 7''-additional start/end area 5' inside the additional work area 7'-additional start/end area 5' inside the work area 7-start/end area 5 inside the work area 7-start/end area 5 disposed outside the work area 7 and the additional work areas 7', 7'', 7''', 7'''', 7'''''. Alternatively, however, a movement of the floor cleaning machine in the opposite direction is possible as well.

The individual components of the route 1 shown in FIG. 1, i.e. the transport path 3, the additional transport paths 3', 3'', 3''', 3'''', 3''''', 3'''''', the work path 9 and the additional work paths 9', 9'', 9''', 9'''', 9''''', can be stored temporarily, for example in the interface or in the floor cleaning machine, and then used for determining different complex routes. A further route can be specified, for example, that comprises the transport path 3 and the work path 9. This route can be determined such that first the transport path 3, then the work path 9, and subsequently the transport path 3 is traveled by the floor cleaning machine. By combining the route and the further route to one total route, for example, a higher cleaning requirement can be addressed in the work area 7 compared to the additional work areas 7', 7'', 7''', 7'''', 7''''' because, in the case of such a total route, the work area 7 is cleaned twice as often as the additional work areas 7', 7'', 7''', 7'''', 7'''''.

It is, for example, also provided that the operator determines or specifies at least one subset consisting of work area 7 and additional work areas 7', 7'', 7''', 7'''', 7''''' for the floor cleaning machine and, for the determined or specified work areas 7, 7', 7'', 7''', 7'''', 7''''', the floor cleaning machine autonomously determines the transport paths 3, 3', 3'', 3''', 3'''', 3''''', 3'''''' and start/end areas 5, 5', 5'', 5''', 5'''', 5''''', 5'''''' with respective corresponding supply devices or intermediate charging points, in particular charging stations or service stations, such as water change stations and/or sweepings disposal stations, for example, necessary for cleaning the work areas 7, 7', 7'', 7''', 7'''', 7'''''.

REFERENCE SIGNS

1 Route
2 Total area
3 Transport path
3', 3'', 3''', 3'''', 3''''', 3'''''' Additional transport path
5 Start/end area
5', 5'', 5''', 5'''', 5''''', 5'''''' Additional start/end area
7 Work area
7', 7'', 7''', 7'''', 7''''' Additional work area
9 Work path
9', 9'', 9''', 9'''', 9''''' Additional work path
11, 11' Direction of the route
101 First step
102 Second step
103 Third step

The invention claimed is:

1. A method of operating for a floor cleaning machine over total area, the method comprising:
providing a floor cleaning machine having a selectively activatable cleaning element, the cleaning element being configured to engage with a floor cleaning surface when the cleaning element is activated;
determining a transport path and at least one additional transport path, the transport path being located in the total area and extending between a first start/end area and a second start/end area, each of the at least one additional transport path being located in the total area and extending between a respective first additional start/end area and a respective second additional start/end area;
determining a work area and at least one additional work area, the work area being located in the total area and having a work path that includes at least one of the first and second start/end areas, each of the at least one additional work area being located in the total area and having a respective additional work path that includes at least one of the first additional start/end areas and the second additional start/end areas; and
operating the floor cleaning machine with a plurality of transport movements and a plurality of cleaning movements over a route that includes the transport path, each of the at least one additional transport path, the work area, and each of the at least one additional work area, each of the transport movements involving movement of the floor cleaning machine between points along an associated one of the transport path and the at least one additional transport path, wherein the cleaning element is autonomously deactivated during each transport movement, each of the cleaning movements involving movement of the floor cleaning machine within an associated one of the work area and the at least one additional work area, wherein the cleaning element is autonomously activated during each cleaning movement.

2. The method of claim 1, wherein determining the work area and the at least one additional work area includes determining the work path within the work area, wherein the route comprises the work path.

3. The method of claim 2, wherein at least one of the work path and all of the at least one additional work path is determined by teaching.

4. The method of claim 3, wherein the teaching involves at least one of traveling the at least one of the work path and all of the at least one additional work path with the floor cleaning machine and inputting the at least one of the work path and all of the at least one additional work path via an interface.

5. The method of claim 1, wherein determining the work area and the at least one additional work area includes determining each of the at least one additional work path, and wherein the route comprises all of the additional work path of each of the at least one additional work area.

6. The method of claim 1, wherein at least one of the transport path and all of the at least one additional transport path is determined by teaching.

7. The method of claim 6, wherein the teaching involves at least one of: a) traveling the at least one of the transport path and all of the at least one additional transport path with the floor cleaning machine, and b) inputting the at least one the transport path and all of the at least one additional transport path via an interface.

8. The method of claim 1, wherein one of the first and second start/end areas and one of the first and second additional start/end areas coincide.

9. The method of claim 1, wherein one of the first and second start/end areas comprises a supply device.

10. The method of claim 9, wherein the supply device is a charging station.

11. The method of claim 1, wherein both a distance to the end of the route and a range distance corresponding to a residual quantity of a charge of the floor cleaning machine are determined along the route, wherein the distance to the end of the route and the range distance corresponding to the residual quantity of the charge of the floor cleaning machine are compared with one another.

12. The method of claim 1, wherein at least two of the transport path, all of the at least one additional transport path, the work path, and all of the at least one additional work path are stored in the floor cleaning machine and are combined in the floor cleaning machine to form the route.

13. The method of claim 1, wherein at least one of the work path and all of the at least one additional work path is determined autonomously by the floor cleaning machine.

14. The method of claim 13, wherein the autonomous determination includes sensing the surroundings of the floor cleaning machine.

* * * * *